US012613748B2

(12) United States Patent　　(10) Patent No.:　US 12,613,748 B2

Heyl et al.　　(45) Date of Patent:　　Apr. 28, 2026

(54) VEHICULAR COMPUTATIONAL TASK ALLOCATION

(71) Applicant: Robert Bosch GmbH, Stuttgart (DE)

(72) Inventors: Andreas Heyl, Weil der Stadt (DE); Dennis Grewe, Renningen (DE); Naresh Ganesh Nayak, Leonberg (DE); Paulius Duplys, Markgroeningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 696 days.

(21) Appl. No.: 18/062,695

(22) Filed: Dec. 7, 2022

(65) Prior Publication Data

US 2023/0221999 A1　Jul. 13, 2023

(30) Foreign Application Priority Data

Jan. 12, 2022　(DE) ..................... 10 2022 200 253.9

(51) Int. Cl.
*G06F 9/50*　　(2006.01)
*H04W 4/40*　　(2018.01)

(52) U.S. Cl.
CPC .......... *G06F 9/5044* (2013.01); *G06F 9/5072* (2013.01); *H04W 4/40* (2018.02)

(58) Field of Classification Search
CPC ........ G06F 9/5044; G06F 9/5072; G06F 9/06; H04W 4/40; H04W 4/029; H04W 4/44; H04W 28/26; G08G 1/096811; G08G 1/096816; G08G 1/096838; G08G 1/164; H04L 67/12; H04L 67/60; H04L 67/10; G01C 21/3446; G01C 21/3492; B60W 50/0205; B60W 50/14; B60W 60/0015; B60W 2050/021; B60W 2050/143; B60W 2050/146; B60W 2555/20; B60W 2555/60; B60Y 2306/15
See application file for complete search history.

(56) References Cited

U.S. PATENT DOCUMENTS

| | | | | |
|---|---|---|---|---|
| 10,992,755 | B1 * | 4/2021 | Tran ......................... | G01S 13/88 |
| 2020/0120458 | A1 * | 4/2020 | Aldana ................. | H04W 28/22 |
| 2020/0313959 | A1 * | 10/2020 | Higuchi .................. | H04L 67/12 |
| 2021/0061306 | A1 * | 3/2021 | Dagan .................... | H04W 4/40 |
| 2023/0019662 | A1 * | 1/2023 | van't Westeinde .. | G01C 21/343 |

* cited by examiner

*Primary Examiner* — Peng Ke
(74) *Attorney, Agent, or Firm* — NORTON ROSE FULBRIGHT US LLP

(57)　　　　ABSTRACT

A computer-implemented method for planning an allocation of at least one computational task from a computational resource comprised in at least one vehicle to one or more of a plurality of external computational resources in a vehicular communications network. The method comprises obtaining a spatial representation of a region characterising at least one route of a vehicle from a first location to a second location, and data characterising an availability of external computational resources at a plurality of locations in the region, providing at least one computational requirement indication of at least one atomic computational task required by the vehicle during a prospective movement of the vehicle from the first location to the second location, comparing the at least one computational requirement indication to the data characterising the availability of external computational resources at the plurality of locations in the region.

13 Claims, 7 Drawing Sheets

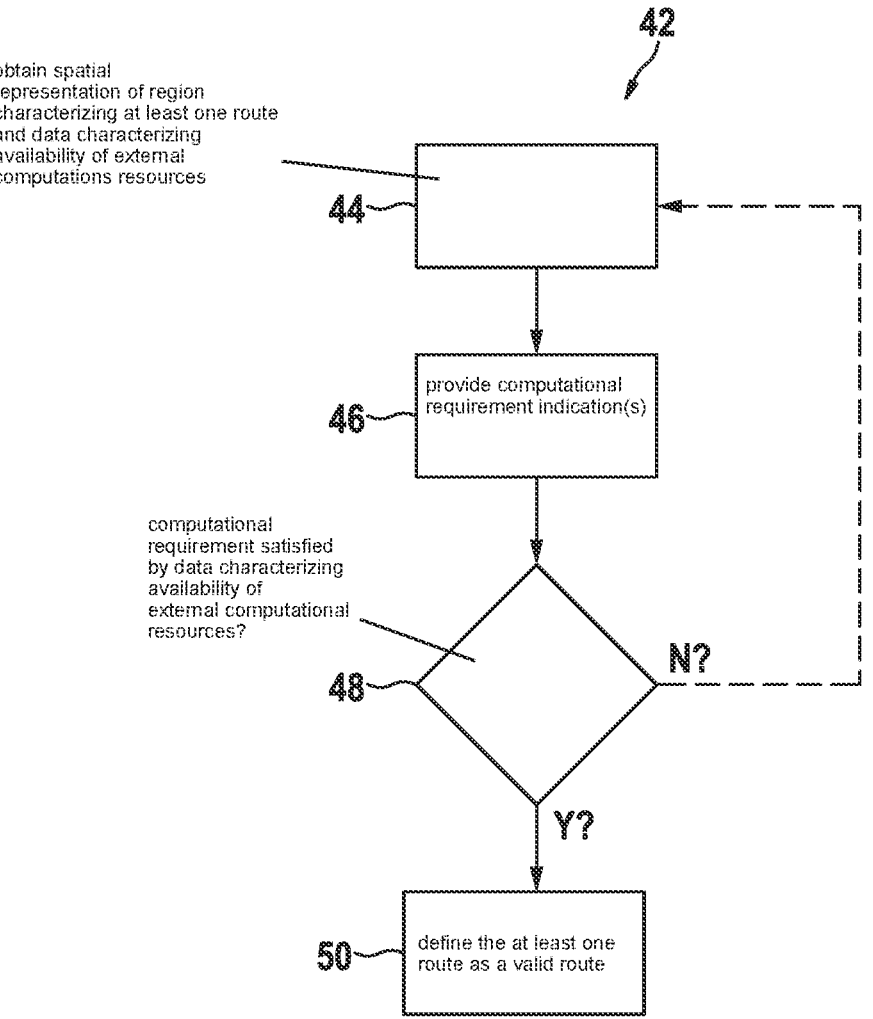

*42* obtain spatial
representation of region
characterizing at least one route
and data characterizing
availability of external
computations resources

*44*

*46* provide computational
requirement indication(s)

computational
requirement satisfied
by data characterizing
availability of
external computational
resources?

*48*

N?

Y?

*50* define the at least one
route as a valid route

Fig. 2

| Segment | Road Type | Speed Limit | Traffic Density | Weather | Topography | Vegetation |
|---------|-----------|-------------|-----------------|---------|------------|------------|
| A1 - B1 | Single Lane, Crossroad | 40 Km/h | 90% | Sun | Uphill | High |
| B1 - B2 | Single Lane, Crossroad | 60 Km/h | 40% | Sun | Flat | None |
| B2 - B3 | Single Lane, Crossroad | 60 Km/h | 40% | Sun | Flat | None |
| B3 - C3 | Single Lane | 40 Km/h | 40% | Sun | Uphill | Moderate |

AR1

| Segment | Road Type | Speed Limit | Traffic Density | Weather | Topography | Vegetation |
|---------|-----------|-------------|-----------------|---------|------------|------------|
| A1 - A2 | Single Lane, Crossroad | 60 Km/h | 90% | Sun | Downhill | None |
| A2 - B2 | Single Lane, Crossroad | 60 Km/h | 40% | Sun | Flat | None |
| B2 - B3 | Single Lane, Crossroad | 60 Km/h | 40% | Sun | Flat | None |
| B3 - C3 | Single Lane | 40 Km/h | 40% | Sun | Uphill | Moderate |

AR2

| Segment | Road Type | Speed Limit | Traffic Density | Weather | Topography | Vegetation |
|---------|-----------|-------------|-----------------|---------|------------|------------|
| A1 - A2 | Single Lane, Crossroad | 60 Km/h | 90% | Sun | Downhill | None |
| A2 - A3 | Single Lane, T-junction | 60 Km/h | 80% | Sun | Downhill | None |
| A3 - B3 | Single Lane, Crossroad | 40 Km/h | 40% | Sun | Flat | High |
| B3 - C3 | Single Lane | 40 Km/h | 40% | Sun | Uphill | Moderate |

| Segment | Continuous Edge Server Coverage | Peak Compute | Comms Latency | Cellular Communications | Short Range Communications | Redundancy Capability |
|---|---|---|---|---|---|---|
| A1 - B1 | Not Required | 5 Gflops | < 10ms | Required | Not Required | 2/1 |
| B1 - B2 | Not Required | 5 Gflops | < 10ms | Required | Not Required | 2/1 |
| B2 - B3 | Not Required | 15 Gflops | < 10ms | Required | Not Required | 2/1 |
| B3 - C3 | Not Required | 5 Gflops | < 10ms | Required | Not Required | 2/1 |

BR2

| Segment | Continuous Edge Server Coverage | Peak Compute | Comms Latency | Cellular Communications | Short Range Communications | Redundancy Capability |
|---|---|---|---|---|---|---|
| A1 - A2 | Required | 20 Gflops | < 5ms | Required | Required | 3/1 |
| A2 - B2 | Not Required | 5 Gflops | < 10ms | Required | Not Required | 2/1 |
| B2 - B3 | Not Required | 15 Gflops | < 10ms | Required | Not Required | 2/1 |
| B3 - C3 | Not Required | 5 Gflops | < 10ms | Required | Not Required | 2/1 |

BR3

| Segment | Continuous Edge Server Coverage | Peak Compute | Comms Latency | Cellular Communications | Short Range Communications | Redundancy Capability |
|---|---|---|---|---|---|---|
| A1 - A2 | Required | 20 Gflops | < 5ms | Required | Required | 3/1 |
| A2 - A3 | Required | 20 Gflops | < 5ms | Required | Required | 3/1 |
| A3 - B3 | Not Required | 5 Gflops | < 10ms | Required | Not Required | 2/1 |
| B3 - C3 | Not Required | 5 Gflops | < 10ms | Required | Not Required | 2/1 |

Fig. 7

VEHICULAR COMPUTATIONAL TASK ALLOCATION

CROSS REFERENCE

The present application claims the benefit under 35 U.S.C. § 119 of German Patent Application No. DE 10 2022 200 253.9 filed on Jan. 12, 2022, which is expressly incorporated herein by reference in its entirety.

FIELD

This present invention relates to a computer-implemented method for planning an allocation of at least one computational task from a computational resource comprised in at least one vehicle to one or more of a plurality of external computational resources in a vehicular communications network, and an associated system, computer program element, and computer readable medium.

BACKGROUND INFORMATION

Infrastructure assisted automated driving systems include autonomous shuttles deployed in an urban environment, or autonomous transportation systems used in factories, or at a seaport, for example. In order to ensure safe and reliable operation of these systems, high computational requirements are required in the vehicles for performing atomic computational tasks such as image-based object detection.

The high computational requirements imply that a large amount of computational hardware must be installed in the autonomous vehicles, leading to a high unit cost and high energy consumption in each autonomous vehicle. Furthermore, each autonomous vehicle might not require its peak computational capability for most driving routes. Accordingly, infrastructure assisted automated driving systems may be further improved.

SUMMARY

According to a first aspect of the present invention, there is provided a computer-implemented method for planning an allocation of at least one computational task from a computational resource comprised in at least one vehicle to one or more of a plurality of external computational resources in a vehicular communications network. According to an example embodiment of the present invention, the method comprises:

obtaining a spatial representation of a region characterising at least one route of a vehicle from a first location to a second location in the region, and data characterising an availability of external computational resources at a plurality of locations in the region;

providing at least one computational requirement indication of at least one atomic computational task required by the vehicle during a prospective movement of the vehicle from the first location to the second location;

comparing the at least one computational requirement indication to the data characterising the availability of external computational resources at the plurality of locations in the region; and if the at least one computational requirement indication is satisfied by the availability of external computational resources at each of the plurality of points on the at least one route, defining the at least one route as a valid route.

An effect of a computer-implemented method according to the present invention is that the availability of external computational resources in a network can be improved to ensure the safe and reliable operation of an automated driving system. It is provided to coordinate computational instances according to the computational tasks required, and the degree of reliability required, to discover the availability of reliable external compute resources. A solution of the present invention provides improving the safety of an autonomous driving system in case of failures of the external computational resources, ranging from re-routing of the vehicle, to coordinating preventative and reactive measures between the external computational resources.

According to a second aspect of the present invention, there is provided a system comprising a vehicle comprising an autonomous driving system controlled by a computational resource comprised in the vehicle, a plurality of external computational resources, a communications network configured to communicably couple the vehicle and the plurality of external computational resources wherein either the computational resource comprised in the vehicle and/or at least one of the external computational resources, is configured to obtain a spatial representation of a region characterising at least one route of a vehicle from a first location to a second location in the region, and data characterising an availability of external computational resources at a plurality of locations in the region, to provide at least one computational requirement indication of at least one atomic computational task required by the vehicle during a prospective movement of the vehicle from the first location to the second location, to compare the at least one computational requirement indication to the data characterising the availability of external computational resources at a plurality of points on the at least one route, and if the at least one computational requirement indication is satisfied by the availability of external computational resources at each of the plurality of points on the at least one route, defining the at least one route as a valid route.

According to a third aspect of the present invention, there is provided a computer program element comprising non-transitory machine readable instructions which, when executed by a processor, cause the processor to perform the steps according to the method of the first aspect, or its embodiments.

According to a fourth aspect of the present invention, there is provided a computer readable medium comprising the computer program element.

BRIEF DESCRIPTION OF THE DRAWINGS

Exemplary embodiments of the present invention are depicted in the figures, which are not to be construed as limiting the scope of the present invention, and are explained in greater detail below.

FIG. 2 schematically illustrates a computer-implemented method according to the first aspect of the present invention.

FIG. 6 shows several tables schematically illustrating exemplary data structures containing route attributes for the routes illustrated in FIG. 4.

FIG. 7 shows several tables schematically illustrating exemplary data structures defining exemplary computational requirement indications between route segments of the routes illustrated in FIG. 4.

DETAILED DESCRIPTION OF EXAMPLE EMBODIMENTS

Figure 1:
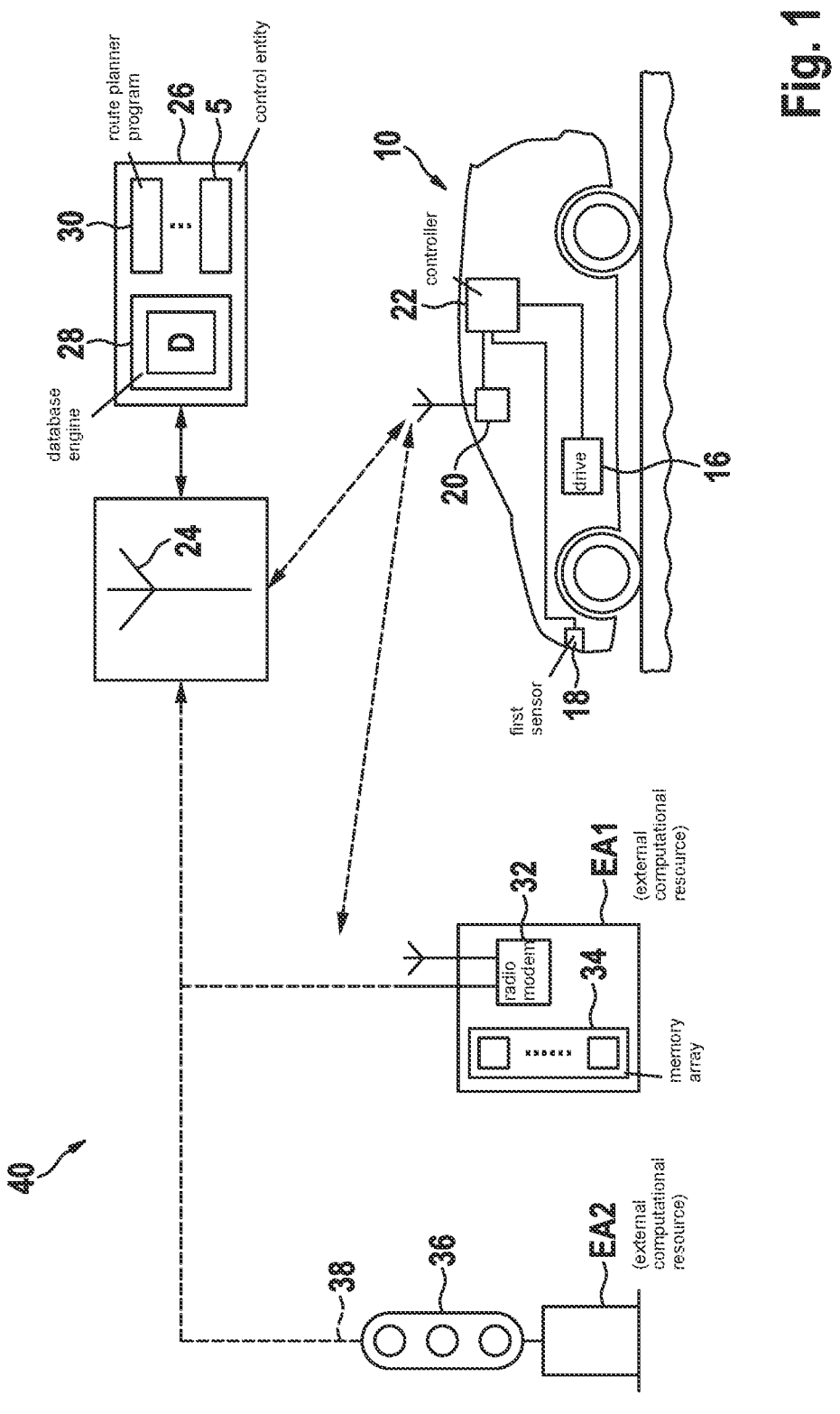
FIG. 1 schematically illustrates a system according to an example embodiment of the present invention.

This present invention concerns the planning and execution of safe edge computing environments for infrastructure assisted automated driving systems. Examples of such systems include autonomous shuttles (such as an autonomous people mover) or autonomous transportation systems (as used in factories or a seaport). Techniques discussed in this specification may also be applicable to semi-assisted driving systems.

Automated driving logic (incorporating, for example, algorithms or pre-processing of sensor data) requires frequent verification of the compute results to detect anomalies in the logic, for example. Such verification requires a high peak computational load. Such verification may require specialised computational hardware (such as graphical processing units, GPUs). Such verification may be required to be performed within a very fast time window, to enable a vehicle to react to a discovery of faulty logic. One option is, therefore, to provision each semi-autonomous or autonomous vehicle with highly specified computational hardware capable of reacting to the peak compute requirement during automated verification of the vehicle's logic. However, providing every semi-autonomous autonomous vehicle with such highly specified computational hardware could be considered to be expensive and unnecessary given how often the peak compute load is required.

A specific example of automated verification of the vehicle's logic is as follows. A still image, or video sequence captured by the vehicle may be transmitted to an external computational resource, along with an instruction to perform at least one atomic computational task such as object tracking on the image or video sequence.

Simultaneously, the vehicle may perform the same atomic computational object tracking task using the image or video sequence captured by the vehicle. The external computational resource receiving the image or video sequence may repeat the atomic computational object tracking task using the same software logic as available on the controller 22 of the vehicle 10. Optionally, the external computational resource receiving the image or video sequence may repeat the object tracking task using a computationally more intensive set of software logic compared to that available on the controller 22 of the vehicle 10. The external computational resource may transmit back to the vehicle 10 its answer to the object tracking task.

The vehicle 10 may compare the answer to the object tracking task obtained from the external computational resource with its own answer to the object tracking task obtained from logic executed within the vehicle 10 controller 22. If the answer to the object tracking task obtained from the external computational resource matches to the answer from the vehicle 10 controller 22, or is within acceptable limits thereof, the vehicle 10 may continue to drive between first and second locations unaffected. If the vehicle 10 detects a non-compliance between the answer to the object tracking task obtained from the external computational resource and the answer from the vehicle 10 controller 22, or the answer of the vehicle 10 is not within acceptable limits thereof, the vehicle 10 may take evasive action. For example, the vehicle 10 may command the drive system 16 to operate according to a more conservative safety envelope (for example, by slowing down, or ultimately by stopping the vehicle 10). A skilled person will appreciate that the vehicle could also transmit its answer to the atomic computational task to the external computational resource, for the external computational resource to identify the non-compliance, and then to transmit back to the vehicle a short message indicating the non-compliance.

This specification therefore proposes to provide additional compute resources that are not comprised within the semi-autonomous or autonomous vehicle, and instead enabling atomic computational tasks to be outsourced to external computational hardware that is not located within the vehicle. One problem with this approach is that the external computation resources need to be available as a vehicle reaches, and drive through, relevant area. The communication network has to support information exchange between the vehicle and the external computational hardware. A situation could arise that the right type or number of items of external computational hardware is not available as a vehicle is driving through a segment of a route, or that the external computational hardware is available, but that a communication link between the vehicle and the external computation hardware is unreliable. In this case, the operational function of the vehicle would not be able to be independently verified by verification logic, and thus the safety of the vehicle could not be assured.

Present solutions address the problem of failures, and thus degradation of the availability of the external computing environment by introducing local redundancy of computational resources in the communication infrastructure. This includes hardware redundancy of the external computational resources (for example, deploying multiple physical components to compensate hardware failures of a particular server). Another solution involves using monitoring software to identify and mitigate failures as they occur. Failures in the communication network are typically addressed by establishing multiple physical communication pass that reduce the risk to a computational task if any one link should fail.

However, handling a complete failure of compute resources in the external computational resources, and the implied safety and security consequences in infrastructure assisted automated driving systems are not addressed the overall system level. The present specification discusses a solution that enables a logically centralized control instance to ensure, and to give a degree of guarantee, to ensure the safe and reliable operation of an automated driving system.

FIG. 1 schematically illustrates a system 40 according to an example.

A vehicle 10 (which may be an autonomous vehicle or a semi-autonomous vehicle) comprises an autonomous driving system. The system comprises a drive means 16, a first sensor 18, a controller 22, and a wireless communication modem 20.

The vehicle 10 may be, for example, vehicle that is semi-autonomously, or autonomously, controlled to carry passengers, goods, cargo and the like from a first location to a second location within a region. The region may be an urban, suburban, or countryside road grid, a factory, a port or airport, for example.

The drive means 16 is, for example, an electric drive system, an internal combustion engine, or a fuel-cell drive system or other hybrid drive system. The drive means 16 may comprise a brake system, a regenerative braking system, a steering system, and the like. In brief, the drive means 16 is configured to receive a motion demand from a controller 22 of the vehicle 10 (optionally adjusted by a human occupant of the vehicle 10). The drive means 16 is configured to translate the location of the vehicle 10 from a first position to a second position based on the motion demand received from the controller 22.

The sensor system 18 is configured to observe the environment in the vicinity of the vehicle 10 and to generate sensor data for provision to the controller 22. The sensor 18 may comprise, for example, LIDARs, global positioning system (GPS) sensors, optical cameras, thermal cameras, RADARs, ultrasonic sensors, feedback signals obtained from an Engine Control Unit (ECU) of the vehicle 10 such as odometer signals, and other sensors that might be utilised in accordance with a semi-autonomous or autonomous vehicle 10.

The controller 22 may include at least one processor and at least one computer readable storage medium. In an example, the controller 22 is a distributed controller comprising a plurality of processors distributed throughout the vehicle 10. The controller 22 may comprise one or more types of processor selected from a central processing unit (CPU), a custom system on chip (SOC), a field programmable gate array (FPGA), a graphics processing unit (GPU), an embedded controller or microprocessor, and the like. The computer readable storage medium may comprise one or more of volatile and nonvolatile storage. For example, the computer readable storage medium may comprise Random Access Memory (RAM), Read only Memory (ROM), electrically erasable programmable read only memory (EEPROM), and other variants known to a person skilled in the art.

The wireless communication modem 20 is configured to communicate information wirelessly to, and to receive information from, other objects. For example, the wireless communication modem 20 may communicate with pedestrian devices (V2P communication), networked devices (V2N), infrastructure devices (V2I), other vehicles (V2V). The wireless communication modem 20 may be configured to use at least one standard provided by IEEE 802.11, 3GPP (for example 3G, 4G, LTE, or 5G), or a dedicated short-range communication channel.

The system 40 further comprises one or more external computational resources EA1, EA2. In the illustrated case, EA1 is a "edge compute node" comprising a radio modem 32 and a heterogenous processor and memory array 34. An edge compute node EA1 may be provided at various locations within a region, and provide a generic computational resource to which compute-intensive tasks may be outsourced from a client process. In the example of the following specification, the controller 22 of the vehicle 10 is configured to outsource computational tasks, for example online logical verification operations of autonomous driving software, to the edge compute node EA1. Other external computational resource EA2 may be found in a further infrastructure item such as a traffic light 36. Therefore, it is not essential that the external computational resources are specifically provided as "edge compute nodes". Spare computational capacity in any suitable item of infrastructure equipment may be given over to online logical verification operations of autonomous driving software as discussed herein, provided a suitable network interface to a vehicle 10 and/or a control entity 26 is provided.

The system 40 further comprises a communications network 24. The communications network 24 is configured to communicate data between the vehicle 10 and the control entity 26, and the plurality of external computational resources EA1, EA2. In an example, the communications network 24 is an LTE or 5G infrastructure network. In an example, the communications network 24 is operably connected to the control entity 26 via a wide area network (WAN) such as the Internet. In an example, the control entity 26 is a server or a cloud service capable of communicating with the communications network 24. In an example, the communications network 24 is operably connected to the plurality of external computational resources EA1, EA2 through the same or similar means to those previously listed. In an example, the control entity 26 is an external computational resource EA1.

The control entity 26 comprises a database engine 28 capable of hosting a database D that is capable of maintaining at least route database R, an external computational resource (edge node) database E, and a vehicle constrained database B, as will subsequently be described.

In an example, the system 40 functions to enable a vehicle 10 to export a computational task from the controller 22 of the vehicle 10 to one of the plurality of external computational resources EA1, EA2 that are communicatively coupled to the vehicle 10. In one example, the computational task that is exported from the controller 22 of the vehicle 10 is a verification of an atomic computational task associated with semi-autonomous or autonomous driving of the vehicle 10. The system 40 discussed previously is one example of a semi-autonomous or autonomous driving system with external computational resources, and a skilled person will appreciate that a wide variety of wireless communication standards, architectures, number of external computation devices, and the like may be implemented without departure from the generality of the overall concept.

According to a first aspect, there is provided a computer-implemented method 42 for planning an allocation of at least one computational task from a computational resource comprised in at least one vehicle 10 to one or more of a plurality of external computational resources EA1, EA2 in a vehicular communications network, comprising:

btaining 44 a spatial representation of a region characterising at least one route of a vehicle R1 from a first location A,1 to a second location C,3 in the region, and data characterising an availability of external computational resources at a plurality of locations in the region;

providing 46 at least one computational requirement indication B of at least one atomic computational task required by the vehicle during a prospective movement of the vehicle from the first location to the second location;

comparing 48 the at least one computational requirement indication to the data characterising the availability of external computational resources at the plurality of locations in the region; and if the at least one computational requirement indication is satisfied by the availability of external computational resources at each of the plurality of points on the at least one route, defining 50 the at least one route as a valid route.

FIG. 2 schematically illustrates a computer-implemented method according to the first aspect.

Figure 3:
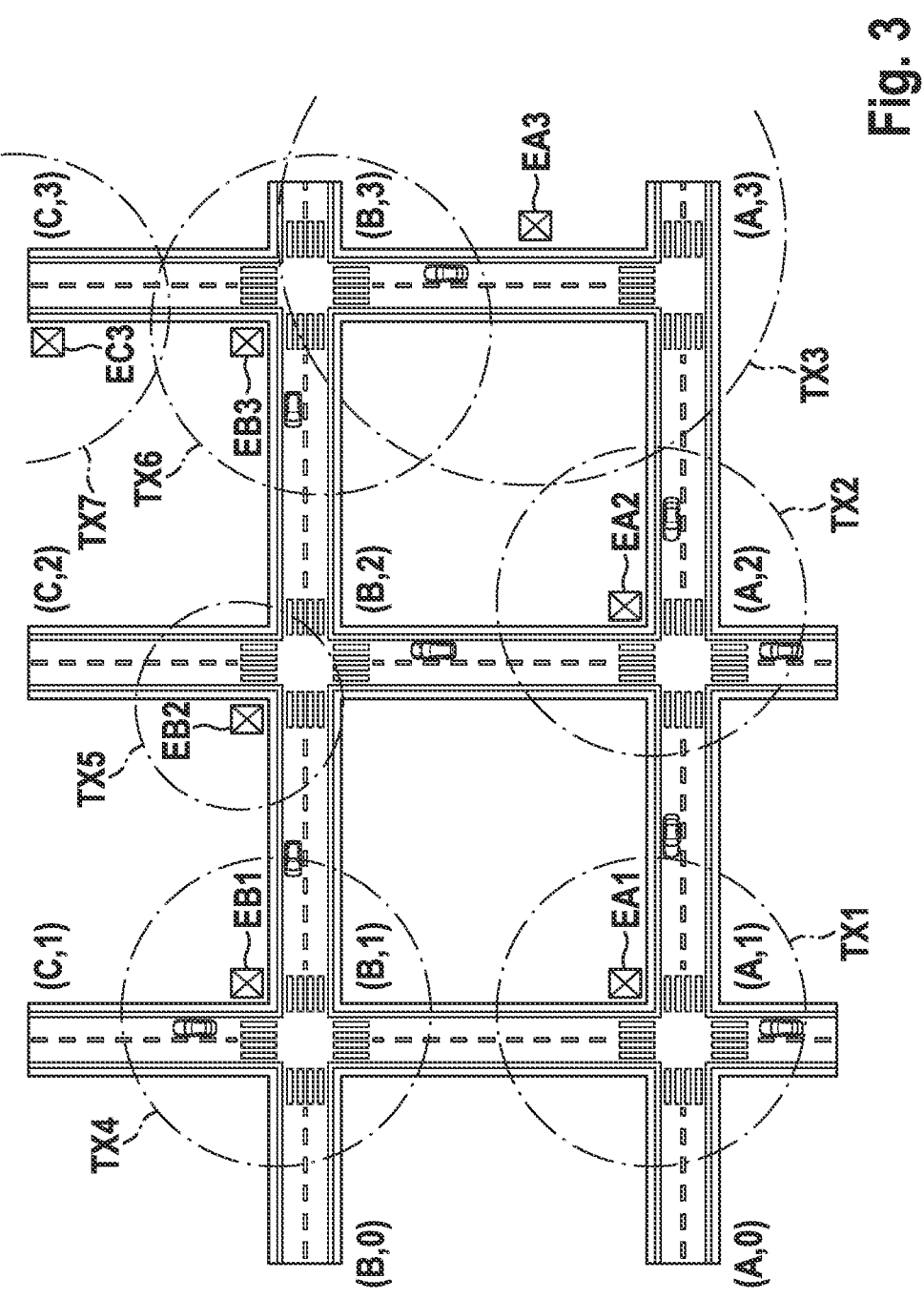
FIG. 3 schematically illustrates a region comprising a plurality of routes and a plurality of edge nodes, according to an example embodiment of the present invention.

FIG. 3 schematically illustrates a region comprising a plurality of routes and a plurality of edge nodes.

In particular, FIG. 3 illustrates a spatial representation of the region characterising at least one route R1, R2, R3 (see FIG. 4) between a first location (A,1) and a second location (C,3). The spatial representation of the region may be provided as a two-dimensional map grid, a three-dimensional terrain-map surface, and the like. In the illustrated case, an urban mobility scenario with a grid-shaped road characteristic extending over approximately 1 km has been illustrated. A skilled person will appreciate that the techniques described herein may be applied across a city (5 km radius), suburban (10 km radius), regional (100 km radius) or national (1000 km radius) dependent on the communications network provided. The locations in the spatial representation are, for convenience in this specification, denoted by coordinates at the grid intersections (A, 1), (A, 2), and the like. However, many different location conventions may be applied, for example exact grid coordinates.

Each of the external computational resources is surrounded by a respective exemplary radio communications radius TX1, TX2, TX3, TX4, TX5, TX6, TX7. In the example of FIG. 3, if a vehicle is within the radio communications radius TX1 of associated external computational resource EA1, then the vehicle 10 may communicate with external computational resource EA1 in a reliable manner. Therefore, FIG. 3 illustrates a case in which a vehicle at the first location of the region (A,1) can drive to a second location of the region (C,3) whilst benefiting from continuous radio coverage with a subset of external computational resources along the sequence EA1 (via TX1), EA2 (via TX2), EA3 (via TX3), EB3 (via TX6), and finally EC3 (via TX7). A skilled person will appreciate that radio coverage of the mobile vehicle in an urban zone is affected by multipath fading, obstruction from mobile blockers, Doppler spread, ground reflection, the presence of vegetation. Therefore, contours of constant quality of service available from a wireless connection to one or more of the plurality of external computational resources will not always appear as perfect circles as illustrated. The representation of a zone of acceptable wireless communication quality of service in FIG. 3 is schematic.

Distributed throughout the spatial representation of the region is a plurality of external computational resources EA1, EA2, EA3, EB1, EB2, EB3, EC3. One or more of the plurality of external computational resources may be a deliberately provided "edge node" configured to receive requests for an offload of computational work from a proximate vehicle. One or more of the plurality of external computational resources may be an infrastructure element such as an electronic traffic light, speed camera, road sign, and the like, configured to advertise spare computational resources to a proximate vehicle. One or more of the plurality of external computational resources may be a radio receiver with a high-bandwidth backhaul connection to a cloud compute node.

One of the tasks of the plurality of external computational resources EAn may be to assist the vehicle 10 in performing one or more computational requirements whilst the vehicle is in the proximity of the relative computational resource EAn. If it is possible for the vehicle 10 to safely offload, along a given route, all of the necessary computational resources across the entire length of the route between the first location (A,1) to the second location (C,3), then that given route is a valid route in the region.

Accordingly, one exemplary task is how to choose subsets of external computational resources EAn that can provide acceptable coverage enabling safe online logic verification to a vehicle 10 as it moves between a first and second location in a region.

A route database R comprises a set of potential routes R={R1, R2, R3 . . . } that a vehicle 10 can take from a first location to a second location in the region.

An edge node database E comprises information describing a set E={E1, E2, E3} of external computational resources (edge nodes), and their availability in the region comprising at least the first location and the second location.

The question of whether, or not, it is possible for the vehicle 10 to safely offload all the necessary computational resources is a function of several main considerations. The computational tasks that must be performed by the vehicle 10 whilst translating between the first location (A,1) to the second location (C,3) may vary based on the route chosen. Travelling along a first route that is somewhat empty of traffic, that has favourable lighting conditions, that has few intersections or pedestrian crossings, in optimal weather conditions, and according to a relatively low speed limit may place relatively low computational requirements on the software executed by the controller 22 of the vehicle 10.

In contrast, travelling along a second route that is subject to a relatively high speed limit with a relatively large number of other vehicles, intersections, in poor weather conditions and with a large amount of ground foliage, may place relatively high computational requirements on the software executed by the controller 22. Thus, in an example, when considering the difficulty of offloading the online verification of logical correctness of semi-autonomous or autonomous driving software, if the vehicle travels along the first route as compared to the second route described, external compute resources having a low computational ability and a higher communication latency could be tolerated as compared to the vehicle travelling along the second route. Therefore, qualitative characteristics of the various route segments that the vehicle 10 may travel along will affect the set of computational resources available to be chosen.

Each of a plurality of computational tasks to be subjected to online logical verification by an external computational resource may be defined as an atomic computational task.

The computational requirements associated with performing an atomic computational task. According to an embodiment, the atomic computational task is related to one, or any combination, of, the following computational tasks: image-based object detection, semantic image segmentation, 3D object detection, object tracking, road detection, lane detection, an uncertainty assessment, a driving behaviour assessment, or vehicle route planning.

For example, image-based object detection or semantic image segmentation may require a higher peak computational intensity at time of day at night in a part of the region having no streetlights but a large amount of surrounding high-speed traffic on a complicated road grid. In contrast, image-based object detection or semantic image segmentation during daytime on a straight road, in good weather, with no surrounding traffic may require a relatively lower peak computational intensity. Such considerations will, in turn, affect the ranking of routes through the region when considering the availability and capabilities of external computational resources in the region.

According to an embodiment, providing the computational requirement indication further comprises analyzing one or more attributes AR1, AR2, AR3 of the route between the first and second locations in the region to estimate one or more characteristics of the at least one atomic computational task to be performed by an autonomous driving system; and generating at least one computational requirement indication B based on the analysis of the one or more attributes.

Figure 5:
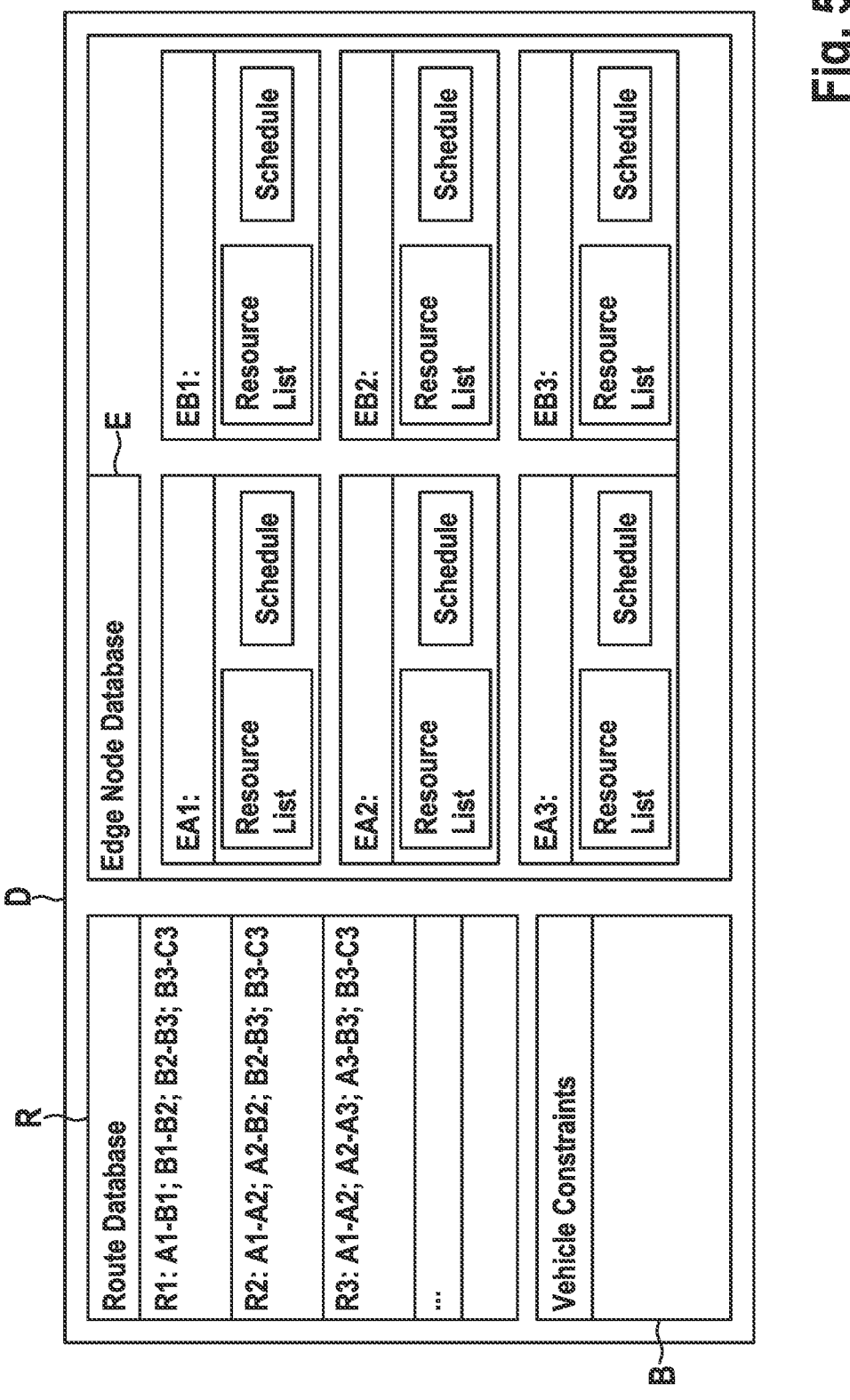
FIG. 5 schematically illustrates a computational environment, according to an example embodiment of the present invention.

Route attributes AR1, AR2, AR3 that may affect one or more of the computational intensity, latency, or qualitative requirements of the atomic computational tasks may be stored in a route database R (as shown in FIG. 5) of a control entity communicably coupled to the system 40. The tables of route attributes AR1, AR2, AR3 given in FIG. 5 are entirely exemplary. For example, for each segment of the region shown in FIG. 3, the route database R may comprise permanent data records defining the road type, speed limit, topography, and vegetation along the segment.

According to an embodiment, the one or more attributes AR1 of the route between the first and second locations comprise one, or any combination, selected from the group: road type, road dimensions, road speed limit, route topography, vehicle traffic density, time of day, or weather characteristics.

For example, one or more of the permanent data records may be a macroscopic categoriser ("single lane"). Alternatively, one or more of the permanent data records may be a function of displacement along the route. For example, the topography data records of the route database R may be a varying function of height based on distance travelled along the segment. One or more of the data records in the route database R may be integrated from other external databases. For example, the "traffic density" data records may be obtained from a traffic information service. The "weather" data records may be obtained from a weather information service.

For example, in FIG. 3, the region contains a road segment (A,1) to (A,2) which may be a single lane road terminating in a crossroads with a speed limit of 60 km/h and traffic density of 90% (defined in the route attribute table AR2 of FIG. 6).

Furthermore, the vehicle 10 itself may provide a set of constraints that affects the set of computational resources chosen such as "continuous edge server coverage required", "estimated time of arrival ETA at (C,3) required", "no route through potentially dangerous zones". Accordingly, a constraint set provided by the vehicle 10 could function to discount one or more of the computational resources EAn in the region.

According to an embodiment, the computational requirement indication of the at least one atomic computational task comprises one, or any combination of: the availability of a dedicated short range communication connection to an external computational resource, the availability of a dedicated cellular communication connection to an external computational resource, a peak or average computational intensity requirement, a peak or average communication latency requirement, a redundancy capability of the external computational resource, an installed software requirement of the external computational resource, a safety critical certification of the external computational resource, a cybersecurity certification of the external computational resource, or a quality of service requirement of the external computational resource.

Figure 4:
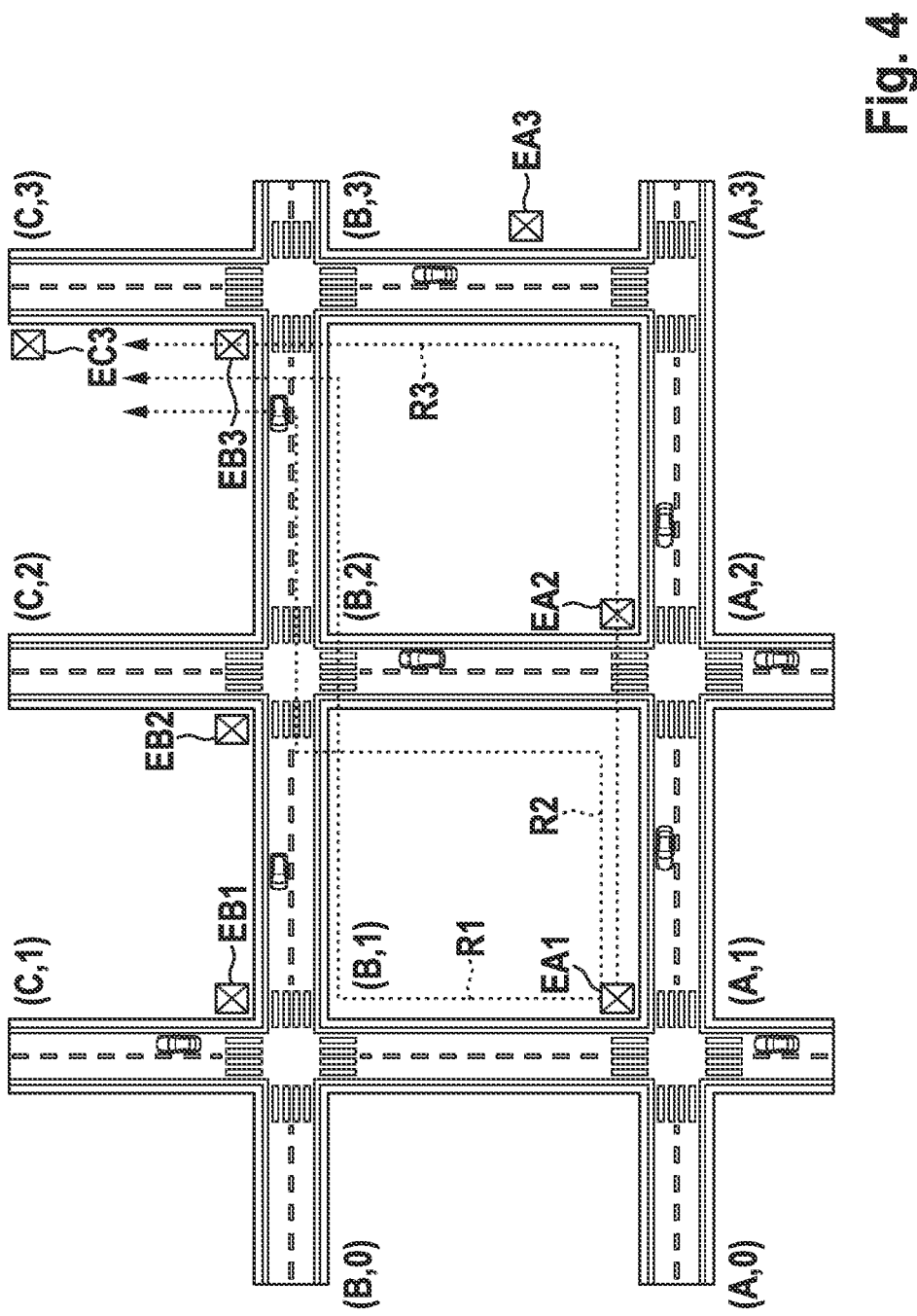
FIG. 4 schematically illustrates the region of FIG. 3 with three potential routes, according to an example embodiment of the present invention.

FIG. 7 shows several tables schematically illustrating exemplary data structures defining exemplary computational requirement indications between route segments of the routes illustrated in FIG. 4. Computational requirement table BR1 corresponds to route attribute table AR1. Computational requirement table BR2 corresponds to route attribute table AR2. Computational requirement table BR3 corresponds to route attribute table AR3.

Therefore, the segment of the region (A, 1) to (A,2) has demanding attributes (a 60 km/h speed limit experienced with a traffic density of 90%) requiring external computational resources having continuous coverage, a significant peak computational load requirement, and low communications latency and triple redundancy. This compares to the segment of the region (B,3)-(C,3) having substantially lower attributes and thus having a computational requirement indication that is less demanding.

Therefore, the database D operated by the control entity 26 may comprise a set of vehicle constraints B forming a set of conditions and constraints provided by the vehicle 10 for these one of the potential routes R1, R2, R3 . . . in the region.

Another constraint is provided by the intrinsic capability of the external computational resources EAn in the region. For example, if one or more of the external computational resources EAn cannot meet the requirements specified by the vehicle 10, then that external computational resource EAn is not available for computing a route for the vehicle 10 through the region.

For example, the intrinsic computational capability of each external computational resource EAn in the region may be defined by one, or more, of the availability of a dedicated short range communication connection to an external computational resource, the availability of a dedicated cellular communication connection to an external computational resource, a peak or average computational intensity capability of a respective external computational resource, a peak or average communication latency ability of a respective computational resource, a redundancy capability of the external computational resource, an installed software specification of the external computational resource, a safety critical certification of the external computational resource, a cybersecurity certification of the external computational resource, or a quality of service requirement of the external computational resource.

Another constraint is optionally provided by how many external computational resources EAn are available simultaneously to a vehicle 10. Some online safety verification scenarios may require, for example, two or three external computational resources EAn to be available to the vehicle at any time.

Another constraint is optionally provided by the previous allocation of the external computational resources EA to other users. For example, some routes may be available to a vehicle 10 at night time, when relatively few external computational resources EAn have been assigned to other users. However, when a significant number of external computational resources EAn have been allocated to other users (perhaps during a high-traffic commute time) then the number of routes available to the autonomous or semiautonomous vehicle may be constrained.

Each of the plurality of external computational resources EA1, EA2, EA3, EB1, EB2, EB3, EC3 is configured to communicate with a vehicle 10 using wireless communications. The quality of the wireless communication link between the vehicle 10 and one or more of the plurality of external computational resources EAn may also be treated as constraint when choosing a route between the first location and a second location in the region.

According to an embodiment, the computer-implemented method further comprises: computing at least one set of external computational resources capable of fulfilling the at least one computational requirement indication during the prospective movement of the vehicle from the first location to the second location on the at least one route defined as a valid route.

The control entity 26 comprises a route planner program 30 that is communicatively coupled to the database engine 28. The route planner program 30 is configured to provide appropriate routes for the vehicle 10 between the first location and the second location in the region.

For example, based on the specific safety requirements of the vehicle 10 and the vehicle constraints be for the journey, the route planner program 30 searches the route database R for valid routes from the first location (A,1) to the second location (C,3) in the region. In an example, the route planner program 30 takes into account the specific safety requirements of the vehicle 10 when computing the valid routes from the first location (A,1) to the second location (C,3).

Accordingly, all application specific requirements, in particular as regards the safety of the vehicle 10 (and by extension, surrounding vehicles and local pedestrians) are taken into account whilst identifying a potential set of external computational resources EAn on a plurality of routes R1, R2, R3 . . . that a vehicle 10 can take. For example, the step of computing the route in view of these constraints can be viewed as a route planning mechanism that is safety sensitive on the route selection based on at least one computational requirement indication of at least one atomic computational task required by the vehicle when travelling along the route.

As one example, a vehicle 10 dependent on a continuous connection to an external computational resource may include routes on which connectivity to at least two additional external computational resources at every location along the route is available. This would ensure a fallback external computational resource in case of a failure of a first-chosen external computational resource, enabling a guarantee of continuous and safe operation of the tasks provided by the external computational resource.

As a further example, a vehicle 10 may be more self-reliant, implying that external computational resources EAn would be passed along a route at least frequently enough to allow regular diagnostics (in terms of the "diagnostic test interval") specified by some safety standards or a realignment (such as a sensor recalibration or misalignment tracking) of vehicle internal components detected by the external computational resource. For example, GPUs comprised in the vehicle controller 22 can be recalibrated based on a check performed at an external computational resource EAn.

In a further step, a list of potential routes AR1, AR2, AR3 and a list of potential external computational resources EAn are identified using information comprised in the database D which fulfil the requirements of the journey between the first location (A,1) and the second location (C,3).

According to an embodiment, a sensitivity analysis may be performed on the list of potential routes and/or the list of potential external computational resources. For example, one or more of the route attributes may be varied, and the list of potential routes and/or the list of potential external computational resources recomputed. For example, the speed limit attribute of a route segment may be varied, to filter external computational resources that do not have the latency or computational throughput to support the vehicle 10 at higher speed limits.

In an example, external computational resources EAn that do not support a specific level of modular redundancy, such as triple model redundancy, are removed from the selection of external computational resources. This may accordingly affect which routes are viable for a vehicle 10.

In an example, external computational resources operating a preferred version of software, or certain software routines are prioritised above other external computational resources. External computational resources that do not operate the preferred version of software, or certain software routines, are removed from the selection of external computational resources. This may accordingly affect which routes are viable for a vehicle 10.

The vehicle 10 then selects a route R1, R2, or R3 in the region that satisfies the "safety sensitive on the route selection" criterion. Optionally, the route selection may be performed by human intervention (by selecting from a menu of viable route options).

According to an embodiment, the control entity 26 may comprise an availability service S configured to monitor the availability of external computational devices EAn, and their current quality of service guarantees relative to the routes R1, R2, and R3. The availability service S may be centralised at the control entity 26, or may include instances operating in one or more of the external computational devices EAn.

The availability service S is used to validate the availability and current status of one or more of the plurality of external computational devices EAn along one or more of the routes R1, R2, R3. The validation may be performed before the vehicle 10 begins its journey, and/or during the vehicle's 10 journey.

According to an embodiment, the computer-implemented method further comprises: -communicating one or more resource reservation messages to each of the external computational resources comprised in the at least one set of external computational resources;

checking, at each external computational resource in the at least one set of external computational resources, whether a corresponding resource reservation compliant with the resource reservation message can be performed; and if each of the external computational resources comprised in the at least one set of external computational resources can perform a resource reservation compliant with the resource reservation message: reserving each external computational resource comprised in the at least one set of external computational resources.

Accordingly, the availability service S of the control entity 26 communicates with each of the external computational resources required to guarantee a selected route R1, R2, R3. Owing to real-time developments (such as a hardware failure), a required external computational resource EAn along one of the selected routes may be unable to service vehicle 10 as it drives along a selected route R1, R2, R3. The process of checking that each external computational resource can service the vehicle 10 prior to the vehicle 10 departing avoid the situation where the vehicle 10 becomes stuck along a selected route R1, R2, R3 because a safety guarantee cannot be offered to the vehicle 10 for a certain segment of a selected route owing to a defective external computational device.

According to an example, the edge node database E comprising data structures defining at least one of the external computational resources EAn additionally defines, for each external computational resource EAn, a schedule. For example, a second vehicle (not shown) may select one of the routes R1, R2, and R3 and initiate its journey along the selected route. The availability service S is capable to predict, given the route of the second vehicle, and the prevailing traffic conditions, an approximate schedule at each of a plurality of external computational resources EAn along the route followed by the second vehicle. Accordingly, the schedule for each of the external computational resources EAn may be partially or fully occupied owing to reservations required by the second vehicle.

Accordingly, the availability service may declare a subset of external computational resources EAn along several of the routes R1, R2, R3 unavailable to the first vehicle 10 at a certain range of times based on information in the schedule of each external computational resource EAn.

If there is no route able to fulfil requirements, the vehicle will not start its journey. This step ensures that a vehicle 10 only travels if the minimal set of external computational resources EAn is available during the journey.

According to an embodiment, the computer-implemented method further comprises: if at least one of the external computational resources comprised in the at least one set of external computational resources can not perform a resource reservation compliant with the resource reservation message:

(i) checking, at each remaining external computational resource in the external computational resources at a plurality of locations in the region, whether a substitute external computational resource is available, and adding the substitute external computational resource to the at least one set of external computational resources, or:

(ii) declaring that the at least one computational requirement indication cannot be serviced.

According to this embodiment, the discovery of a defective external computational resource is possible because the availability service S frequently checks the availability of external computational resources EAn during the journey of the vehicle 10. If an external computational resource EAn fails, the availability service S can select another route (if available) and/or external computational resource EAn, this functionality ensures the safe operation of the vehicle by ensuring that edge servers are available even during the journey.

According to an embodiment, the computer-implemented method further comprises:

detecting, during a translation of the vehicle along the valid route between the first location towards the second location in the region, a failure or non-compliance of an external computational resource with at least one computational requirement indication in at least one set of external computational resources associated with the valid route; and recomputing a remaining portion of the route between the first and second locations based on at least one computational requirement indication.

For example, a passing test vehicle can be used to verify the availability of particular external computational resources EAn in the region, and to report this information to the availability service S accordingly. In an embodiment, a passing test vehicle can offload a specimen atomic computational task to a particular external computational resource EAn, to verify the ability of the external computational resource EAn to correctly perform the specimen atomic computational task. This may be particularly useful for the purposes of security or accuracy verification of external computational resources.

According to an embodiment, the computer-implemented method further comprises:

based on the recomputed route between the first and second locations, recomputing, at least one updated set of external computational resources capable of fulfilling the at least one computational requirement indication during the prospective movement of the vehicle to the second location from its current location;

communicating one or more update resource reservation messages to each of the updated set of external computational resources;

checking, at each external computational resource in the at least one updated set of external computational resources, whether a corresponding resource reservation compliant with the resource reservation message can be performed; and if each of the external computational resources comprised in the at least one updated set of external computational resources can perform a resource reservation compliant with the resource reservation message: reserving each external computational resource comprised in the at least one updated set of external computational resources.

If a recomputed route between first and second locations as required, an online check is performed by the availability service S to ensure that the vehicle 10 can be rerouted along the recomputed route. If all external computational resources along the updated set of segments required to complete the route are available, then all external computational resources along the updated set of segments update their schedules to reflect the updated route. External computational resources along the remainder of the previous route release segments of their schedules that are no longer required.

According to an embodiment, the computer-implemented method further comprises:

if at least one of the external computational resources comprised in the at least one updated set of external computational resources can not perform a resource reservation compliant with the resource reservation message: transmitting a safety warning.

According to an embodiment, computing the at least one computational requirement indication to the data characterising the availability of external computational resources at a plurality of points on the at least one route is performed by the computational resource comprised in the vehicle, by an external computation service, or by a cloud computation service.

The availability service S can also be used to improve the availability of the overall set of external computational resources EAn. In an example, the availability service S is configured to direct a request from at least one external computational resource the performance of internal checks to validate availability of the at least one external computational service.

In an example, the availability service S is configured to send a message requesting that one or more vehicles in the vicinity of an external computational resource EA1 should perform validation checks on the external computational resource EA1. For example, the availability service S may request a vehicle 10 performs availability, latency, or result validations of the external computational resource EA1.

In an example, the availability service S is configured to transmit a message to at least one external computational resource EA1 to update and/or install software in advance to ensure the availability, or to improve quality of service, relevant for the vehicle constraints B prior to the arrival time of the vehicle 10. In an example, the available to service S is configured to transmit a message to at least one external computational resource EA1 to delete software following the arrival time of the vehicle 10.

In an example, the availability service is configured to reserve resources via the schedule of each external computational resource EAn based on, for example, the arrival time of the vehicle 10 to ensure that an external computational resource is available and has resources available to fulfil the computation at the server. This further allows the balancing of compute resources in the overall system of external computational resources according to the demanded safety level of the vehicle 10.

In an example, the availability service S is distributed amongst the plurality of external computational devices EAn. In an example, the availability service S may be divided into geographical locations, where each geographical subset of the availability service S (S$_G$) is able to reduce the load compared to a centralised availability service S, whilst each geographically focused availability service S$_G$ is configured to plan routes within its geographical division. Interaction with other availability services of other geographical divisions may be performed if a journey exceeds the geolocation of geographically focused availability service S$_G$.

According to an embodiment, the availability service S may be configured to select a different route for the vehicle 10 in response to environmental changes. For example, high traffic volumes during peak times, traffic accidents, high number of legacy vehicles in the route, bad weather or poor lighting conditions on portions of the route would imply that the computational requirements to verify the logic implemented by vehicle 10 would be increased, hence increasing the safety risk of the originally planned route. Accordingly, a geographical overlay of the region may define a real-time safety risk index along routes or route segments which could be calculated based on information being sent from external computational resources in the region.

According to a second aspect, there is provided a system 40 comprising:

a vehicle 10 comprising an autonomous driving system 16, 18, 19, 20 controlled by a computational resource 22 comprised in the vehicle;

a plurality of external computational resources EA1, EA2; and a communications network 24 configured to communicably couple the vehicle and the plurality of external computational resources.

At least one of the computational resource comprised in the vehicle and/or at least one of the external computational resources, is configured to:

obtain a spatial representation of a region characterising at least one route of a vehicle from a first location to a second location in the region, and data characterising an availability of external computational resources at a plurality of locations in the region;

provide at least one computational requirement indication of at least one atomic computational task required by the vehicle during a prospective movement of the vehicle from the first location to the second location;

compare the at least one computational requirement indication to the data characterising the availability of external computational resources at a plurality of points on the at least one route; and if the at least one computational requirement indication is satisfied by the availability of external computational resources at each of the plurality of points on the at least one route, defining the at least one route as a valid route.

According to a third aspect. a computer program element is provided comprising non-transitory machine readable instructions which, when executed by a processor, cause the processor to perform the steps according to the first aspect.

According to a fourth aspect, there is provided a computer readable medium comprising the computer program element according to the third aspect.

Computer implementations based on the foregoing embodiments may be implemented using a wide variety of software approaches. Programs, program modules, scripts, functions, and the like can be designed in languages such as Javascript, C++ or C, Java, PHP, RUBY, PYTHON, or other languages.

The computer readable medium is configured to store a computer program, application, logic including machine code capable of being executed by a processor. The computer readable medium includes RAM, ROM, EEPROM, and other devices that store information that may be used by the processor. In examples, the processor and the computer readable medium are integrated on the same silicon die, or in the same packaging. In examples, the computer readable medium is a hard disc drive, solid state storage device, or the like. In an example, the signal may be communicated over a data communication network such as the Internet as a download, or software update, for example.

The examples provided in the figures and described in the foregoing written description are intended for providing an understanding of the principles of this specification. No limitation to the scope of the present invention is intended thereby. The present specification describes alterations and modifications to the illustrated examples. Only the preferred examples have been presented, and all changes, modifications and further applications to these within the scope of the specification are desired to be protected.

What is claimed is:

1. A computer-implemented method for routing a vehicle, the method comprising:

obtaining a spatial representation of a region;

identifying a plurality of candidate routes for the vehicle to travel from a first location in the region to a second location in the region;

obtaining data identifying a plurality of external computational resources located in the region and characterizing respective locations and computational capabilities of the external computational resources with which the vehicle can communicate over a vehicular communication network;

for each respective one of the candidate routes, estimating a respective computational requirement representing an amount of processing power expected to be needed by the vehicle if the vehicle travels along the candidate route, the estimating for the respective candidate route being based at least in part on (I) conditions expected to be present along the respective candidate route and (II) a determination of at least one atomic computational task the vehicle is estimated to require during a prospective movement of the vehicle over a course of the respective candidate route;

for each of the candidate routes, determining, using the data characterizing the respective locations and computational capabilities of the external computational resources, how well the external computational resources are expected to satisfy the estimated computational requirement for the candidate route;

selecting one of the candidate routes as a valid route based at least in part on differences between the candidate routes in terms of how well the external computational resources are expected to satisfy the respective computational requirements; and based on the selection, initiating traversal by the vehicle of the valid route.

2. The computer-implemented method according to claim 1, wherein the conditions include one, or any combination, selected from the following group: road type, road dimensions, road speed limit, route topography, vehicle traffic density, time of day, weather characteristics.

3. The computer-implemented method according to claim 1, wherein the atomic computational task is related to one, or any combination, of, the following computational tasks: image-based object detection, semantic image segmentation, 3D object detection, object tracking, road detection, lane detection, an uncertainty assessment, a driving behaviour assessment, vehicle route planning.

4. The computer-implemented method according to claim 1, wherein the computational requirement comprises one, or any combination of the following:

an availability of a dedicated short range communication connection to an external computational resource, an availability of a dedicated cellular communication connection to an external computational resource, a peak or average computational intensity requirement, a peak or average communication latency requirement, a redundancy capability of the external computational resource, an installed software requirement of the external computational resource, a safety critical certification of the external computational resource, a cybersecurity certification of the external computational resource, a quality of service requirement of the external computational resource.

5. The computer-implemented method according to claim 1, further comprising:

computing at least one set of the external computational resources capable of fulfilling the estimated computational requirement during the prospective movement of the vehicle from the first location to the second location on the valid route.

6. The computer-implemented method according to claim 5, further comprising:

communicating one or more resource reservation messages to each of the external computational resources comprised in the at least one set of the external computational resources;

checking, at each external computational resource in the at least one set of the external computational resources, whether a corresponding resource reservation compliant with the resource reservation message can be performed; and based on each of the external computational resources comprised in the at least one set of the external computational resources being able to perform a resource reservation compliant with the resource reservation message: reserving each external computational resource comprised in the at least one set of the external computational resources.

7. The computer-implemented method according to claim 6, further comprising:

based on at least one of the external computational resources comprised in the at least one set of the external computational resources not being able to perform a resource reservation compliant with the resource reservation message:

(i) checking, at each remaining external computational resource in the external computational resources at a plurality of locations in the region, whether a substitute external computational resource is available, and adding the substitute external computational resource to the at least one set of external computational resources, or (ii) declaring that the computational requirement cannot be serviced.

8. The computer-implemented method according to claim 1, further comprising:

detecting, during a translation of the vehicle along the valid route between the first location towards the second location in the region, a failure or non-compliance of an external computational resource with at least one computational requirement in at least one set of external computational resources associated with the valid route; and recomputing a remaining portion of the route between the first location and the second location based on at least one computational requirement indication.

9. The computer-implemented method according to claim 8, further comprising:

based on the recomputed route between the first and second locations, recomputing, at least one updated set of the external computational resources capable of fulfilling the at least one computational requirement during the prospective movement of the vehicle to the second location from its current location;

communicating one or more update resource reservation messages to each of the updated set of the external computational resources;

checking, at each external computational resource in the at least one updated set of the external computational resources, whether a corresponding resource reservation compliant with the resource reservation message can be performed; and based on each of the external computational resources comprised in the at least one updated set of the external computational resources being able to perform a resource reservation compliant with the resource reservation message: reserving each external computational resource comprised in the at least one updated set of the external computational resources.

10. The computer-implemented method according to claim 9, further comprising:

based on at least one of the external computational resources comprised in the at least one updated set of the external computational resources not being able to perform a resource reservation compliant with the resource reservation message: transmitting a safety warning.

11. The computer-implemented method according to claim 1, wherein the determining of how well the external computational resources are expected to satisfy the estimated computational requirement is performed by a computational resource that is in the vehicle or by an external computation service or by a cloud computation service.

12. A system, comprising:

a vehicle including an autonomous driving system;

a plurality of external computational resources; and a communications network configured to communicably couple the vehicle and the plurality of external computational resources;

wherein either the computational resource in the vehicle and/or at least one of the external computational resources is configured to:

obtain a spatial representation of a region;

identify a plurality of candidate routes for the vehicle to travel from a first location in the region to a second location in the region;

obtain data identifying a plurality of external computational resources located in the region and characterizing respective locations and computational capabilities of the external computational resources with which the vehicle can communicate over a vehicular communication network;

for each respective one of the candidate routes, estimate a respective computational requirement representing an amount of processing power expected to be needed by the vehicle if the vehicle travels along the candidate route, the estimation for the respective candidate route being based at least in part on (I) conditions expected to be present along the respective candidate route and (II) a determination of at least one atomic computational task the vehicle is estimated to require during a prospective movement of the vehicle over a course of the respective candidate route;

for each of the candidate routes, determine, using the data characterizing the respective locations and computational capabilities of the external computational resources, how well the external computational resources are expected to satisfy the estimated computational requirement for the candidate route;

select one of the candidate routes as a valid route based at least in part on differences between the candidate routes in terms of how well the external computational resources are expected to satisfy the respective computational requirements; and based on the selection, initiate traversal by the autonomous driving system of the vehicle of the valid route.

13. A non-transitory computer readable medium on which is stored a computer program that is executable by a processor and that, when executed by the processor, causes the processor to perform a method for providing a vehicle, the method comprising the following:

obtaining a spatial representation of a region;

identifying a plurality of candidate routes for the vehicle to travel from a first location in the region to a second location in the region;

obtaining data identifying a plurality of external computational resources located in the region and characterizing respective locations and computational capabilities of the external computational resources with which the vehicle can communicate over a vehicular communication network;

for each respective one of the candidate routes, estimating a respective computational requirement representing an amount of processing power expected to be needed by the vehicle if the vehicle travels along the candidate route, the estimating for the respective candidate route being based at least in part on (I) conditions expected to be present along the respective candidate route and (II) a determination of at least one atomic computational task the vehicle is estimated to require during a prospective movement of the vehicle over a course of the respective candidate route;

for each of the candidate routes, determining, using the data characterizing the respective locations and computational capabilities of the external computational resources, how well the external computational resources are expected to satisfy the estimated computational requirement for the candidate route;

selecting one of the candidate routes as a valid route based at least in part on differences between the candidate routes in terms of how well the external computational resources are expected to satisfy the respective computational requirements; and based on the selection, initiating traversal by the vehicle of the valid route.

* * * * *